(12) United States Patent
Wang

(10) Patent No.: US 8,022,668 B2
(45) Date of Patent: Sep. 20, 2011

(54) CHARGER

(75) Inventor: Ke-Guan Wang, Tu-Cheng (TW)

(73) Assignee: Cheng Uei Precision Industry Co., Ltd., Taipei Hsien (TW)

( * ) Notice: Subject to any disclaimer, the term of this patent is extended or adjusted under 35 U.S.C. 154(b) by 495 days.

(21) Appl. No.: 12/292,051

(22) Filed: Nov. 12, 2008

(65) Prior Publication Data

US 2010/0117597 A1    May 13, 2010

(51) Int. Cl.
*H02J 7/02* (2006.01)
(52) U.S. Cl. .................................. 320/111; 320/107
(58) Field of Classification Search .............. 320/107, 320/111
See application file for complete search history.

(56) References Cited

U.S. PATENT DOCUMENTS 6,275,002 B1 * 8/2001 Chen ........................... 320/111
6,969,269 B2 * 11/2005 Sakai ........................... 439/131

* cited by examiner

*Primary Examiner* — Bot Ledynh
(74) *Attorney, Agent, or Firm* — Rosenberg, Klein & Lee

(57) ABSTRACT

A charger includes a shell assembly defining a receiving space therein, a locating body fixed in the shell assembly and defining a locating cavity and a plurality of locating fillisters communicating with the locating cavity, and a plug pivotally received in the receiving space and having a base portion and at least two conductive blades fixed partially in the base portion. The base portion protrudes oppositely to form a pair of pivoting shafts pivoted in the shell assembly. A free end of one of the pivoting shafts defines a locating pillar pivoted in the locating cavity of the locating body. A side surface of the locating pillar protrudes outward to form a plurality of locating ribs buckled into the corresponding locating fillisters of the locating body when the conductive blades of the plug are completely rotated into and out of the receiving space.

9 Claims, 5 Drawing Sheets

US 8,022,668 B2

CHARGER

BACKGROUND OF THE INVENTION

1. Field of the Invention

The present invention generally relates to a charger, and more particularly to a charger with a rotatable plug.

2. The Related Art

A conventional charger includes a shell assembly and a plug having a pivoting shaft. The pivoting shaft of the plug is pivoted in the shell assembly in order to make the plug be able to be either rotated out from the shell assembly for being in use or rotated into the shell assembly for being put away. Two ends of the pivoting shaft respectively define a cube. Four side surfaces of each cube are defined as four corresponding contact surfaces. The shell assembly defines two locating poles respectively inserted in two springs. One end of each spring has a contact portion connected thereon. The contact portions abut against the corresponding contact surfaces of the cubes so as to ensure that the plug can be either firmly received in the shell assembly to be well put away or firmly stretch out of the shell assembly to be well used. However, the combination of the locating pole, the spring and the contact portion together has a complicated structure and occupies a relatively large space in the shell assembly.

SUMMARY OF THE INVENTION

An object of the present invention is to provide a charger. The charger includes a shell assembly defining a receiving space therein, a locating body fixed in the shell assembly and defining a locating cavity and a plurality of locating fillisters communicating with the locating cavity, and a plug pivotally received in the receiving space and having a base portion and at least two conductive blades fixed partially in the base portion. The base portion protrudes oppositely to form a pair of pivoting shafts pivoted in the shell assembly. A free end of one of the pivoting shafts defines a locating pillar pivoted in the locating cavity of the locating body. A side surface of the locating pillar protrudes outward to form a plurality of locating ribs buckled into the corresponding locating fillisters of the locating body when the conductive blades of the plug are completely rotated into or out of the receiving space.

As described above, the above-mentioned charger utilizes the locating body to cooperate with the locating ribs so as to make the plug well located, instead of a locating pole, a spring and a contact portion cooperating with contact surfaces of a cube according to a conventional technology. Therefore, the charger has a simple structure and the locating body occupies a relatively small space in the shell assembly.

BRIEF DESCRIPTION OF THE DRAWINGS

The present invention will be apparent to those skilled in the art by reading the following description of a preferred embodiment thereof, with reference to the attached drawings, in which.

DETAILED DESCRIPTION OF THE PREFERRED EMBODIMENT

Figure 1:
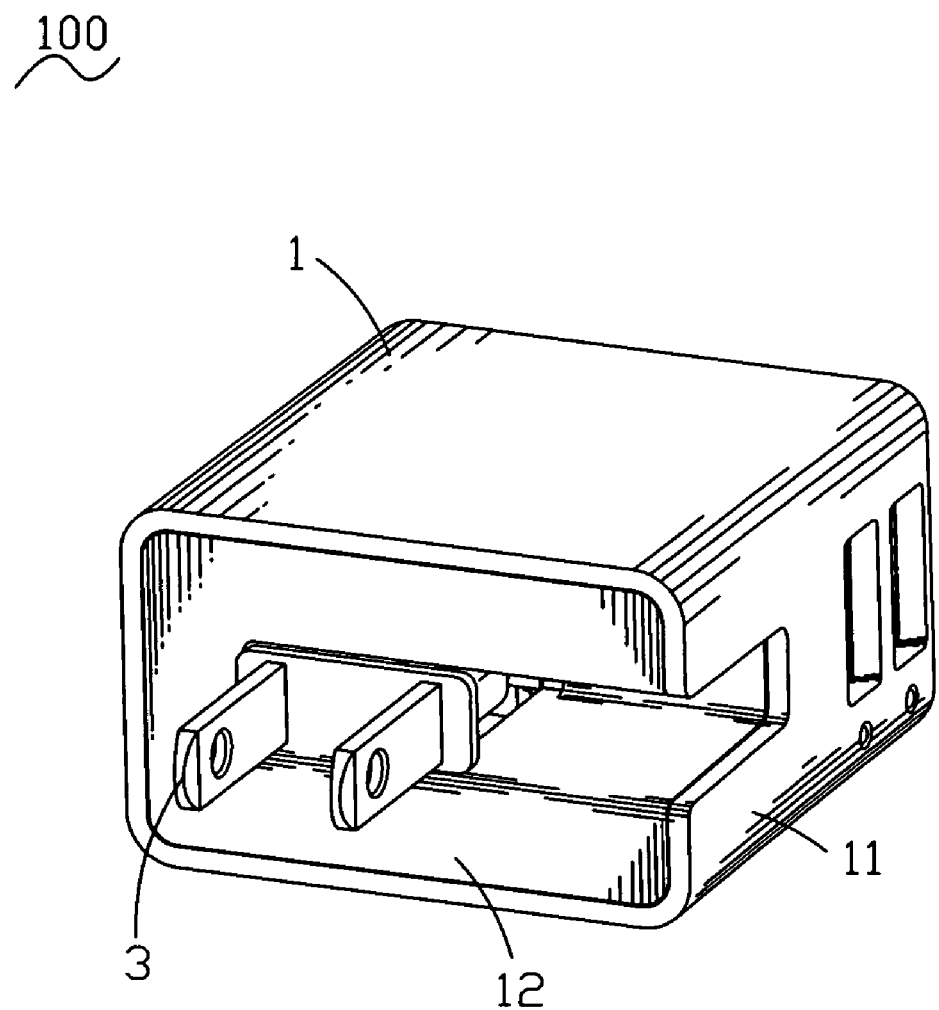
FIG. 1 is a perspective view of a charger in accordance with the present invention.
Figure 2:
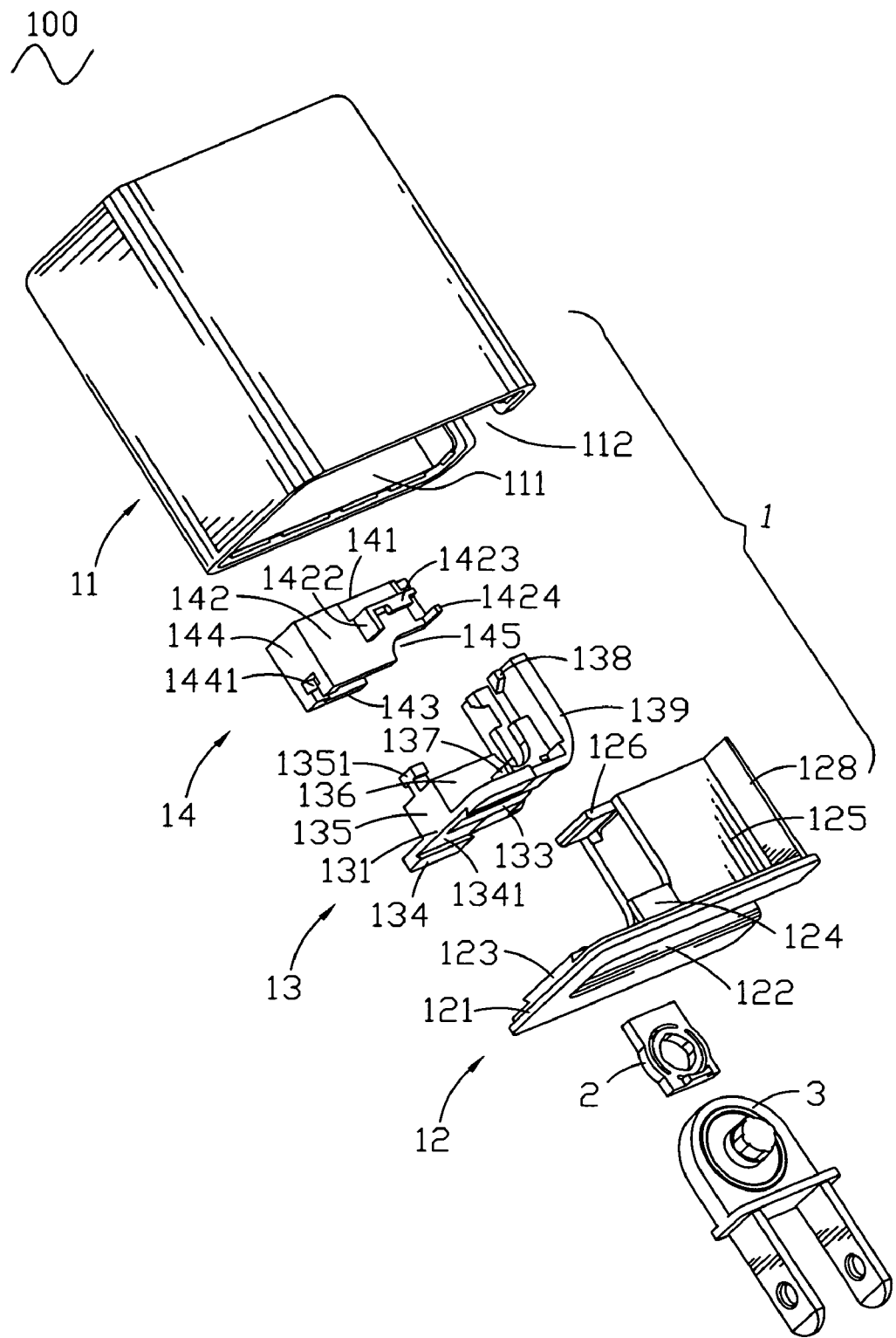
FIG. 2 is an exploded perspective view of the charger of FIG. 1.
Figure 3:
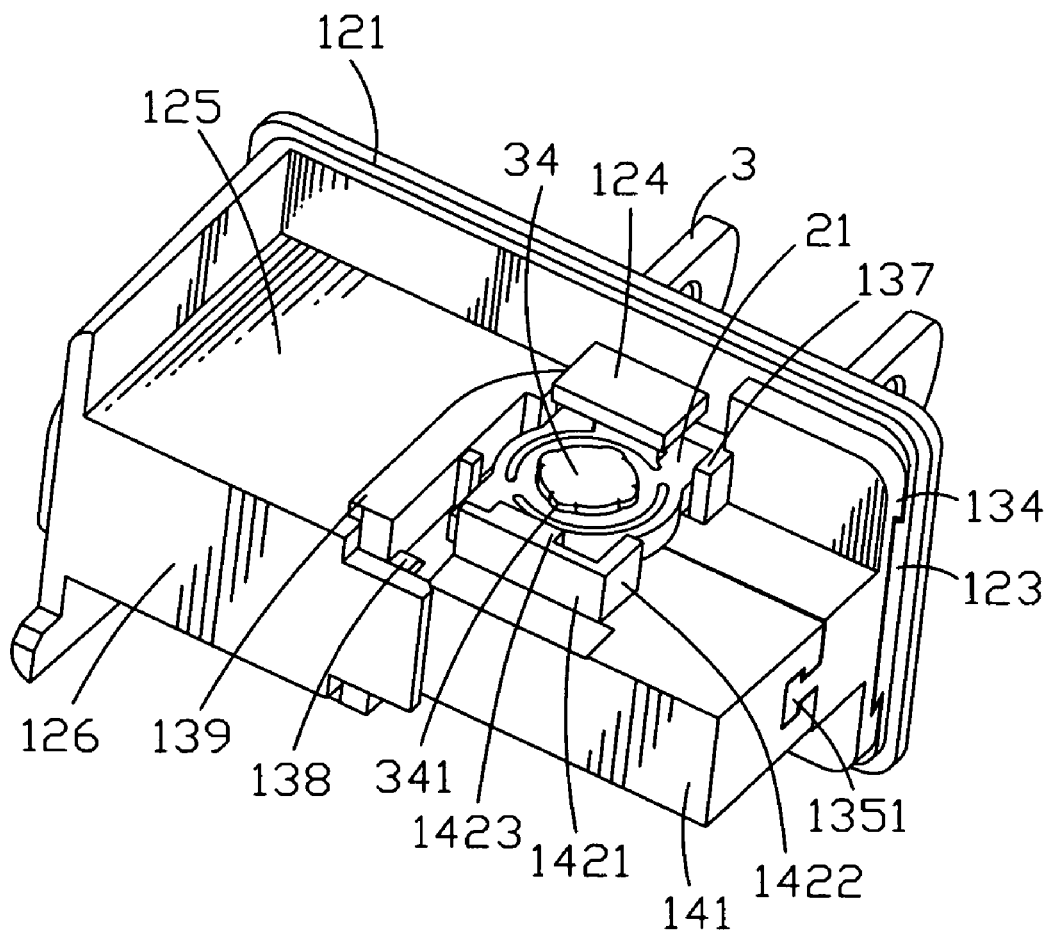
FIG. 3 is another angle perspective view of the charger of FIG. 1 without a first receiving shell.

With reference to FIG. 1 and FIG. 2, a charger 100 according to the present invention includes a shell assembly 1, a locating body 2 and a plug 3 disposed in the shell assembly 1 respectively.

Figure 4:
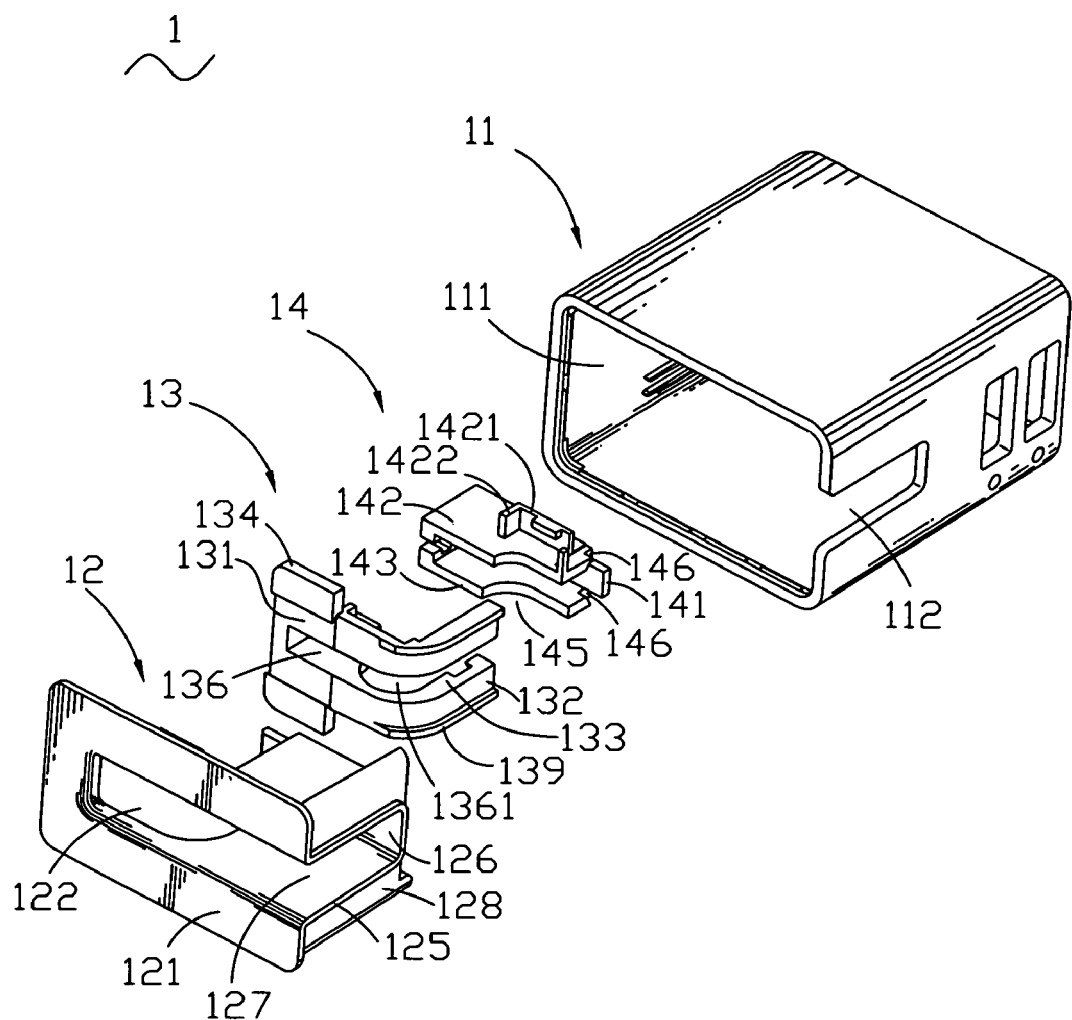
FIG. 4 is an exploded perspective view of a shell assembly of the charger of FIG. 1.

Referring to FIG. 2 and FIG. 4, the shell assembly 1 includes a first receiving shell 11, a second receiving shell 12, a first pivoting shell 13 and a second pivoting shell 14. The first receiving shell 11 is a rectangular cylindrical shape and defines a rectangular receiving recess 111 having a front communicating with the outside therein. A right side of the first receiving shell 11 defines a rectangular side window 112 communicating with the receiving recess 111 and having a front opened freely.

The second receiving shell 12 has a rectangular base plate 121 disposed vertically. The base plate 121 defines a rectangular first guiding window 122 passing therethrough and having a right end penetrating through a right side of the base plate 121 to be opened freely. The base plate 121 protrudes rearward to form a swallow-tailed first fixing block 123 adjacent to a left end of the first guiding window 122. Two edges of the base plate 121 respectively adjacent to a top and a bottom of the first guiding window 122 extend rearward to form a pair of preventing plates 125 at right. A connecting plate 126 is connected between the two preventing plates 125 at rear. The preventing plates 125 and the connecting plate 126 together define a receiving space 127 communicating with the first guiding window 122. A left end of the connecting plate 126 extends out of the receiving space 127. Right sides of the two preventing plates 125 extends opposite each other to form a pair of fastening plates 128 connected with the base plate 121. The base plate 121 protrudes rearward to form a first locating portion 124 near the top of the first guiding window 122 and between the preventing plate 125 and the first fixing block 123.

The first pivoting shell 13 is substantially L-shaped and has a rectangular first base board 131 disposed vertically. A right end of the first base board 131 is bent rearward and then extends to form a second base board 132. An L-shaped second guiding window 133 is defined across the junction of the first base board 131 and the second base board 132, and it has a rear end passing through a rear side of the second base board 132 to be opened freely. Two edges of the first base board 131 respectively adjacent to a top and a bottom of the second guiding window 133 extend rearward to form a pair of preventing boards 136 connected with the second base board 132. A connecting board 135 is connected between the two preventing boards 136 at left and further connected with the first base board 131. The connecting board 135 protrudes rearward to form a T-shaped second fixing block 1351. Each of the preventing boards 136 defines a substantially semi-circular first pivoting gap 1361 passing through a rear of the corresponding preventing board 136 and adjacent to the second base board 132. The two first pivoting gaps 1361 are coaxial with each other. A front of the preventing board 136 at top protrudes upward to form a second locating portion 137 connected with the first base board 131 and located near a left of the corresponding pivoting gap 1361. A top and a bottom of the first base board 131 extend vertically and oppositely and then protrude forward to form two fastening blocks 134 at left. A swallow-tailed first fixing groove 1341 is formed between the two fastening blocks 134. Two edges of the second base board 132 far away from the second guiding window 133 protrude rightward to form a pair of fixing arms 139. A rear end of the second base board 132 protrudes leftward to form two third fixing blocks 138 respectively adjacent to the top and the bottom of the second guiding window 133 and apart from the right rear of the corresponding preventing boards 136.

The second pivoting shell 14 is substantially rectangular and has a top board 142, a bottom board 143, a rear board 141 and a left sideboard 144. A right end of the rear board 141 extends beyond the top board 142 and the bottom board 143. A front of the left sideboard 144 defines a T-shaped second fixing groove 1441 passing therethrough and having a front end opened freely. Each right front of the top board 142 and the bottom board 143 is cut off to form an arc-shaped second pivoting gap 145 matched with the corresponding first pivoting gap 1361 of the first pivoting shell 13. The two pivoting gaps 145 are coaxial with each other. Each right end of the top board 142 and the bottom board 143 defines a third fixing groove 146 at rear. The top board 142 protrudes upward to form a rectangular third locating portion 1421 extending longwise and located behind the corresponding second pivoting gap 145. A left end of the third locating portion 1421 extends forward to form a fourth locating portion 1422 connected with the top board 142. A top of the third locating portion 1421 extends forward to form a fifth locating portion 1423. The right end of the top board 142 protrudes upward to form a sixth locating portion 1424 at front.

Figure 5:
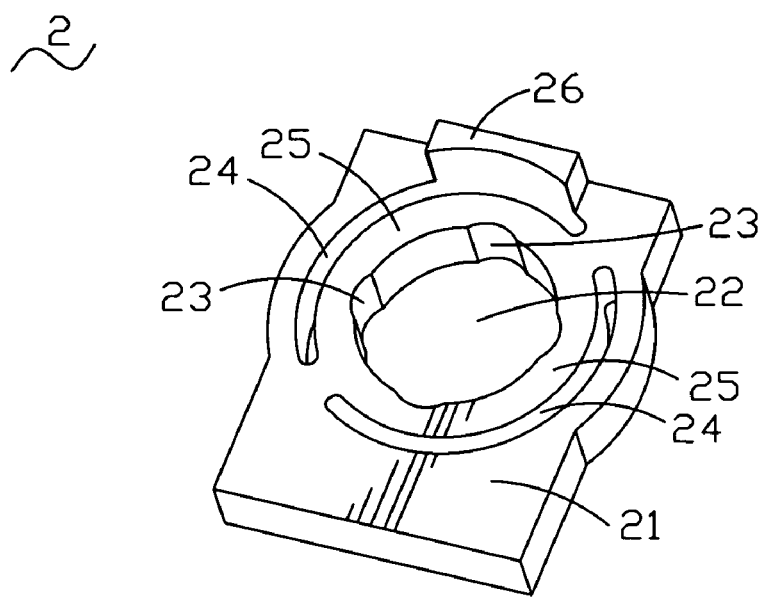
FIG. 5 is a perspective view of a locating body of the charger of FIG. 1.

Referring to FIG. 5, the locating body 2 has a substantially rectangular locating board 21. A middle of the locating board 21 defines a circular locating cavity 22 vertically passing therethrough. The locating board 21 further defines two substantially semi-annular receiving channels 24 located to encircle the locating cavity 22. The two receiving channels 24 are in a same circle and coaxial with the locating cavity 22. Accordingly, two elastic portions 25 are respectively formed between the locating cavity 22 and the corresponding receiving channels 24. An inside of each of the elastic portions 25 defines two arc-shaped locating fillisters 23 vertically extending to pass therethrough and communicating with the locating cavity 22. The four locating fillisters 23 are distributed equidistantly along a circumference direction of the locating cavity 22. A middle of a front of the locating board 21 protrudes upward to form a limiting portion 26.

Figure 6:
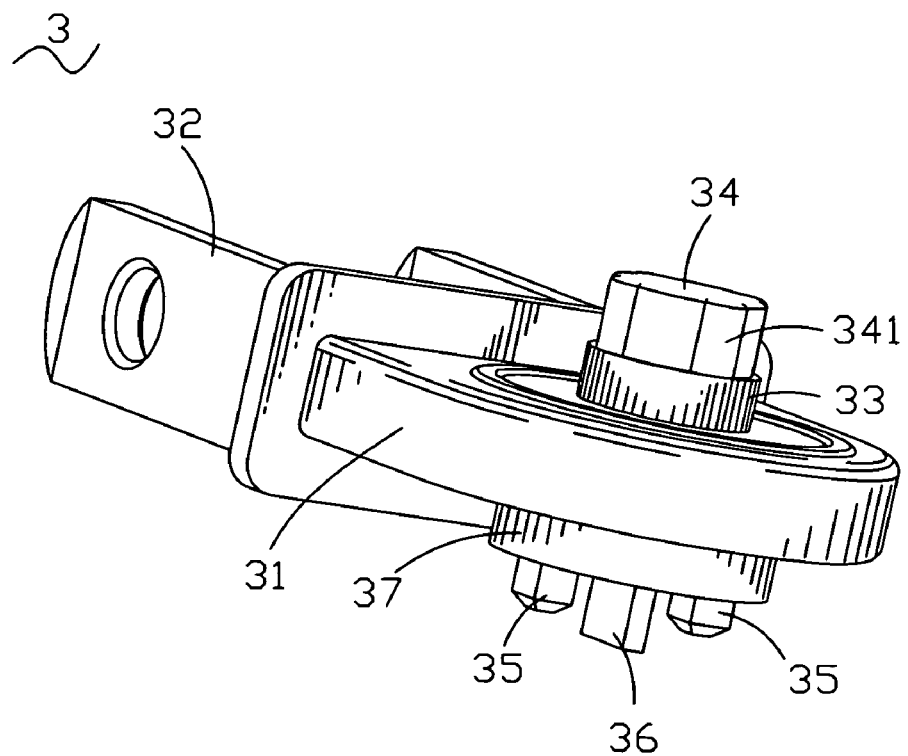
FIG. 6 is a perspective view of a plug of the charger of FIG. 1.

Referring to FIG. 6, the plug 3 has a U-shaped base portion 31 and a pair of conductive blades 32 having one end firmly inserted in the base portion 31 and the other end stretching out of a front of the base portion 31. A middle of a top of the base portion 31 protrudes upward to form a column-shaped first pivoting shaft 33, and a middle of a bottom of the base portion 31 protrudes downward to form a column-shaped second pivoting shaft 37. The first pivoting shaft 33 extends upward to form a column-shaped locating pillar 34. A side surface of the locating pillar 34 protrudes outward to form four arc-shaped locating ribs 341 extending vertically and distributed equidistantly along a circumference direction of the locating pillar 34. Two connecting terminals 35 each have one end fixed in the second pivoting shaft 37 to be electrically connected with the corresponding conductive blades 32 and the other end stretching out of a bottom of the second pivoting shaft 37. A middle of the bottom of the second pivoting shaft 37 protrudes downward to form a protecting protrusion 36 located between the two connecting terminals 35.

Referring to FIGS. 1-6, when the charger 100 is assembled, the base portion 31 of the plug 3 is rotatably received in a space formed by first pivoting shell 13 and the second pivoting shell 14, and the conductive blades 32 stretch out of the second pivoting shell 13. The second fixing block 1351 of the first pivoting shell 13 is snapped into the second fixing groove 1441 of the second pivoting shell 14. The third fixing block 138 is snapped into the corresponding third fixing groove 146 and the right end of the rear board 141 is buckled into a rear of the second guiding window 133. Each right end of the top board 142 and the bottom board 143 is snapped between the right rear of the preventing board 136 and the corresponding third fixing block 138. So the first pivoting shell 13 and the second pivoting shell 14 are firmly assembled together. The first pivoting gaps 1361 are mated with the corresponding second pivoting gaps 145 to respectively pivot the first pivoting shaft 33 and the second pivoting shaft 37. Therefore the plug 3 can be rotated along the second guiding window 133. The locating body 2 is disposed on the top board 142 and the corresponding preventing board 136, and fixed among the second locating portion 137, the third locating portion 1421, the fourth locating portion 1422 and the sixth locating portion 1424. The fifth locating portion 1423 abuts against a top of the locating board 21. The locating pillar 34 is pivoted in the locating cavity 22 and the locating ribs 341 are buckled into the corresponding locating fillisters 23. Then the first fixing block 123 of the second receiving shell 12 is snapped in the first fixing groove 1341 of the first pivoting shell 13 and the two fixing arms 139 clip the corresponding preventing plates 125 therebetween. The left end of the connecting plate 126 abuts against a rear of the rear board 141. The first locating portion 124 abuts against a top of the limiting portion 26. So the first pivoting shell 13 and the second pivoting shell 14 are firmly assembled to the second receiving shell 12. The second guiding window 133 communicates with the first guiding window 122 and the receiving space 127. The conductive blades 32 may be received in the receiving space 127. At last, the second receiving shell 12, the first pivoting shell 13 and the second pivoting shell 14 are received in the receiving recess 111 of the first receiving shell 11. The base plate 121 of the second receiving shell 12 is fastened in the front of the receiving recess 111 to make the first guiding window 122 connected with the side window 112. The right sides of the preventing plates 125 abut against two corresponding inner edges of the right side of the first receiving shell 11 adjacent to a top and a bottom of the side window 112 to make the receiving space 127 communicate with the side window 112. The fastening plates 128 tightly abut against an inner surface of the right side of the first receiving shell 11. The connecting terminals 35 are electrically connected with a printed circuit board (not shown).

When the charger 100 is not used, the plug 3 is rotated to make the conductive blades 32 thereof received in the receiving space 127 of the second receiving shell 12. In this case, the locating ribs 341 of the plug 3 are buckled into the corresponding locating fillisters 23 of the locating body 2 so as to ensure the conductive blades 32 received in the receiving space 127 firmly. While the conductive blades 32 are rotated out from the receiving space 127 for being used, the locating pillar 34 rotates in the locating cavity 22 that make the locating ribs 341 slide out from the corresponding locating fillisters 23 to compress the elastic portions 25 which deform the elastic portions 25 elastically to slightly stretch into the corresponding receiving channels 24. When the conductive blades 32 are completely out of the receiving space 127, the locating ribs 341 are again buckled into the corresponding locating fillisters 23 and the elastic portions 25 are reinstated again so as to ensure that the plug 3 is firmly located and the charger 100 is well used.

As described above, the charger 100 of the present invention utilizes the locating body 2 to cooperate with the locating ribs 341 so as to make the plug 3 well located, instead of a locating pole, a spring and a contact portion cooperating with contact surfaces of a cube according to a conventional technology. Therefore, the charger 100 of the present invention has a simple structure and the locating body 2 occupies a relatively small space in the shell assembly 1.

What is claimed is:

1. A charger, comprising:
a shell assembly defining a receiving space therein;
a locating body fixed in the shell assembly and defining a locating cavity and a plurality of locating fillisters communicating with the locating cavity; and
a plug pivotally received in the receiving space and having a base portion and at least two conductive blades fixed partially in the base portion, the base portion protruding oppositely to form a pair of pivoting shafts pivoted in the shell assembly, a free end of one of the pivoting shafts defining a locating pillar pivoted in the locating cavity of the locating body, a side surface of the locating pillar protruding outward to form a plurality of locating ribs buckled into the corresponding locating fillisters of the locating body when the conductive blades of the plug are completely rotated into and out of the receiving space.

2. The charger as claimed in claim 1, wherein the locating body further defines two receiving channels encircling the locating cavity, two elastic portions are accordingly formed between the locating cavity and the corresponding receiving channels, the locating fillisters are respectively defined on inner surfaces of the elastic portions.

3. The charger as claimed in claim 2, wherein the locating cavity is circular, the two receiving channels are substantially semi-annular in a same circle and coaxial with the locating cavity, the locating fillisters are distributed equidistantly on the inner surfaces of the elastic portions along a circumference direction of the locating cavity, the locating pillar is column-shaped and the locating ribs are formed equidistantly on the side surface of the locating pillar along a circumference direction of the locating pillar.

4. The charger as claimed in claim 1, wherein the shell assembly includes a receiving shell and a pivoting shell, the receiving shell defines a side window and a first guiding window connected with the side window, the receiving space is defined in the receiving shell and communicates with the first guiding window and the side window for pivotally receiving the conductive blades of the plug therein, the pivoting shell is assembled in the receiving shell for pivoting the base portion of the plug therein, the locating body is fixed on the pivoting shell.

5. The charger as claimed in claim 4, wherein the pivoting shell includes a first pivoting shell assembled to the receiving shell and a second pivoting shell assembled to the first pivoting shell, the first pivoting shell has a base board defining a second guiding window communicating with the receiving space and the first guiding window, the base board extends rearward to form a pair of preventing boards adjacent to two sides of the second guiding window, each of the preventing boards defines a substantially semi-circular first pivoting gap passing therethrough, the two pivoting gaps are coaxial with each other, the second pivoting shell has a top board and a bottom board each defining an arc-shaped second pivoting gap passing therethrough, the two second pivoting gaps are coaxial with each other, the first pivoting gaps are mated with the corresponding second pivoting gaps to respectively pivot the two pivoting shafts of the plug therein, the base portion of the plug is pivoted among the preventing boards, the top board and the bottom board.

6. The charger as claimed in claim 5, wherein the preventing board at top of the first pivoting shell and the top board of the second pivoting shell respectively protrude upward to form a plurality of locating portions near the first pivoting gap and the corresponding second pivoting gap for fastening the locating body thereamong.

7. The charger as claimed in claim 5, wherein the receiving shell further protrudes to form a locating portion located above the first pivoting gap at top of the first pivoting shell, the locating body further protrudes upward to form a limiting portion abutting against a bottom of the locating portion.

8. The charger as claimed in claim 5, wherein the receiving shell defines a swallow-tailed first fixing block, the base board of the first pivoting shell defines a swallow-tailed first fixing groove for snapping the first fixing block therein.

9. The charger as claimed in claim 5, wherein the first pivoting shell further has a connecting board protruding rearward from the base board and connected between the preventing boards, the connecting board protrudes rearward to form a second fixing block, the second pivoting shell further has a sideboard, a front of the sideboard defines a second fixing groove for snapping the second fixing block therein.

* * * * *